(No Model.)
A. E. CARTER.
ROAD CART.
No. 301,857. Patented July 15, 1884.
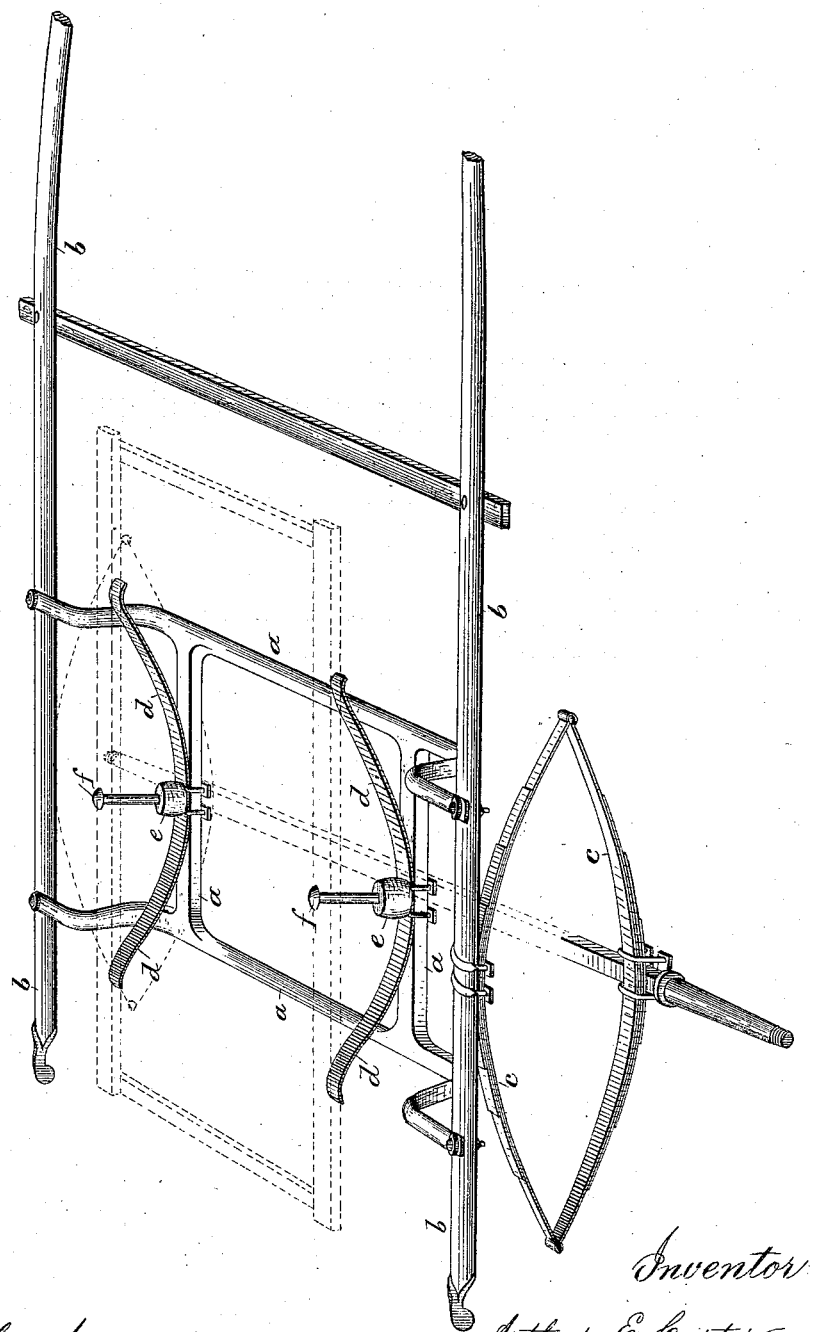
Attest.
Geo. T. Smallwood.
Geo. L. Wheelock.
Inventor
Arthur E. Carter.
By Knight Bros.
attys.

UNITED STATES PATENT OFFICE.

ARTHUR E. CARTER, OF HUDSON, MICHIGAN.

ROAD-CART.

SPECIFICATION forming part of Letters Patent No. 301,857, dated July 15, 1884.

Application filed May 19, 1884. (No model.)

*To all whom it may concern:*

Be it known that I, ARTHUR E. CARTER, a citizen of the United States, residing at Hudson, in the county of Lenawee and State of Michigan, have invented certain new and useful Improvements in Road-Carts, of which the following is a specification.

My invention relates to two-wheeled road-carts, and has for its object the taking up of all horse motion, which, in similar vehicles as heretofore constructed, is imparted to the body, and gives the same an unpleasant jogging motion fore and aft.

To this end my invention consists in placing between the frog or frame on which the body rests and the body itself a spring, which effectually takes up such motion.

The accompanying drawing is a perspective view of the running-gear of a road-cart with my improvement applied, the wheels being omitted and the position of the body dotted in outline.

$a$ represents the frame or frog of the vehicle, and $b$ the shafts which support the same, said shafts being supported on springs $c$, which may be of any desired construction. Instead of resting the floor of the body directly on the top of the frog $a$, as heretofore, I interpose between them a pair of springs, $d$, which bear at their centers upon the said frame, and at their extremities against the under side of the floor. In case it should not be found undesirable to make the springs $d$ of sufficient strength to sustain the weight of the body, a rubber buffer, $e$, may be employed, which should be located at the juncture of the said spring and the frog $a$. This buffer $e$ may be held in position by a bolt, $f$, which may also hold the body of the vehicle in place. I do not, however, desire to limit myself to any precise method of securing the body, as it is obvious that there are many ways in which it may be done. For example, it may be bolted, screwed, or otherwise secured to the extremities of the springs $d$, and the buffer $e$ dispensed with or connected to the upper part of the frame independently of the body.

Having thus described my invention, what I claim as new therein, and desire to secure by Letters Patent, is—

1. In a vehicle, the combination, with the frog or frame supported by suitable springs, of the body and a spring or springs interposed between said frame and body, as and for the purpose set forth.

2. In a vehicle, the combination, with the frog or frame, suitable springs for supporting the same, and the body, of one or more springs bearing on said frame and on the under side of the body, and a spring-buffer for sustaining the weight of the body, as explained.

3. In a vehicle, the combination, with the frog or frame, suitable springs for supporting the same, and the body, of a pair of springs resting at their respective centers upon said frame and bearing upward at their extremities upon the under side of the body, and a buffer for sustaining the weight of said body, the whole being secured together substantially as described.

ARTHUR E. CARTER.

Witnesses:
JAMES B. THORN,
T. W. FOLCHARD.